United States Patent
Bevilacqua et al.

(10) Patent No.: US 9,436,231 B2
(45) Date of Patent: Sep. 6, 2016

(54) REST DETECTION USING ACCELEROMETER

(75) Inventors: Mathew W. Bevilacqua, San Francisco, CA (US); Kaushik Sridharan, Irvine, CA (US); Yehonatan Kochinski, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/082,294

(22) Filed: Apr. 7, 2011

(65) Prior Publication Data

US 2012/0259578 A1    Oct. 11, 2012

(51) Int. Cl.
    *G01P 15/00*    (2006.01)
    *G06F 1/16*    (2006.01)
    *G06F 3/0346*    (2013.01)

(52) U.S. Cl.
    CPC .......... *G06F 1/1694* (2013.01); *G06F 3/0346* (2013.01); *G06F 2200/1637* (2013.01)

(58) Field of Classification Search
    CPC ........................... G06F 1/1694; G06F 3/0346
    USPC ........................................................ 702/141
    See application file for complete search history.

(56) References Cited

U.S. PATENT DOCUMENTS

| | | | |
|---|---|---|---|
| 7,365,736 B2 * | 4/2008 | Marvit et al. ................ | 345/156 |
| 7,667,686 B2 * | 2/2010 | Suh ............................. | 345/156 |
| 8,139,030 B2 * | 3/2012 | Zhao et al. .................. | 345/158 |
| 8,239,840 B1 * | 8/2012 | Czymontek ............... | G06F 8/34 717/125 |
| 8,612,146 B2 * | 12/2013 | Waters ................... | G01C 21/16 701/507 |
| 2005/0212751 A1 * | 9/2005 | Marvit et al. ............... | 345/156 |
| 2006/0061545 A1 * | 3/2006 | Hughes et al. .............. | 345/156 |
| 2007/0067094 A1 * | 3/2007 | Park ...................... | G01C 22/006 702/141 |
| 2009/0195497 A1 | 8/2009 | Fitzgerald et al. | |
| 2009/0265671 A1 | 10/2009 | Sachs et al. | |
| 2009/0312973 A1 * | 12/2009 | Hatlestad et al. ............ | 702/85 |
| 2010/0161084 A1 * | 6/2010 | Zhao et al. .................. | 700/85 |

FOREIGN PATENT DOCUMENTS

| | | |
|---|---|---|
| JP | H11257981 A | 9/1999 |
| JP | 2006139537 A | 6/2006 |
| JP | 2010009498 A | 1/2010 |
| JP | 2010157106 A | 7/2010 |
| WO | WO 2010042625 A2 | 4/2010 |
| WO | WO 2010065664 A1 | 6/2010 |

OTHER PUBLICATIONS

International Search Report and Written Opinion—PCT/US2012/032592—ISA/EPO—Jul. 19, 2012.
Paul Keir et al., "Gesture-recognition with Non-referenced Tracking", 3D User Interfaces, 2006. 3DUI 2006. IEEE Symposium on in 3D User Interfaces, 2006. 3DUI 2006. IEEE Symposium on (2006), pp. 151-158.

* cited by examiner

*Primary Examiner* — Sujoy Kundu
*Assistant Examiner* — Ricky Ngon
(74) *Attorney, Agent, or Firm* — Brian Momeyer

(57) ABSTRACT

Example methods, apparatuses, or articles of manufacture are disclosed herein that may be utilized, in whole or in part, to facilitate or support one or more operations or techniques for detecting a state of rest of a mobile communication device using, at least in part, output signals from an accelerometer.

37 Claims, 5 Drawing Sheets

REST DETECTION USING ACCELEROMETER

BACKGROUND

1. Field

The present disclosure relates generally to motion sensing in mobile communication devices and, more particularly, to rest detection using accelerometer output signals for use in or with mobile communication devices.

2. Information

Mobile communication devices, such as, for example, cellular telephones, portable navigation units, laptop computers, personal digital assistants, or the like are becoming more common every day. These devices may include, for example, a variety of sensors to support a number of applications in today's market. A popular market trend in sensor-based mobile technology includes, for example, applications that may sense or recognize one or more aspects of a motion of a mobile communication device and use such aspects as a form of input. For example, certain applications may sense or recognize one or more informative hand or wrist gestures of a user and may use such gestures as inputs representing user commands or selections in various motion-controlled games, web page browsing, indoor or outdoor navigation, or the like.

Typically, although not necessarily, motion-based applications may utilize one or more motion sensors capable of converting physical phenomena into analog or digital signals. These sensors may be integrated into (e.g., built-in, etc.) or otherwise supported by (e.g., stand-alone, etc.) a mobile communication device and may detect a motion of the mobile device by measuring, for example, the direction of gravity or magnetic field, luminous intensity of the ambient light, various vibrations, or the like. For example, a mobile communication device may feature one or more accelerometers, gyroscopes, magnetometers, gravitometers, ambient light detectors, proximity sensors, thermometers, etc., capable of measuring various motion states, orientations, locations, etc. of the mobile device. The above sensors, as well as other possible sensors, may be utilized individually or in combination with other sensors, depending on a particular application. The utilization of multiple sensors, however, may present a number of challenges, such as increased complexity, size, cost, power consumption, etc. of a mobile communication device.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
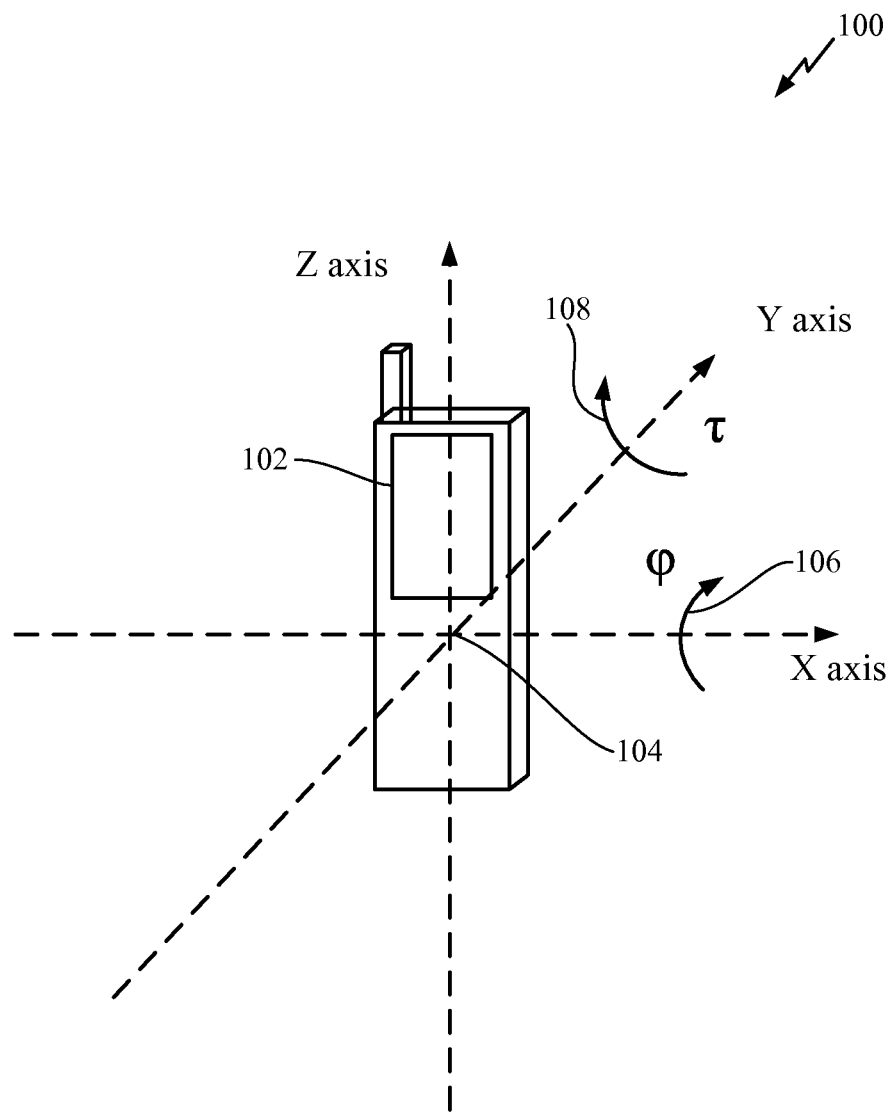
FIG. 1 is an example coordinate system that may be used for rest detection of a mobile device according to an implementation.

Example implementations relate to detecting a state of rest of a mobile device using, at least in part, output signals from an accelerometer. In one implementation, a method may comprise measuring a level of acceleration vibration of a mobile device based, at least in part, on at least one signal received from at least one inertial sensor; detecting a change in an angle of a measured gravity vector applied to the mobile device contemporaneously with the acceleration vibration; and determining whether the mobile device is at rest based, at least in part, on the measured level and the detected change.

In another implementation, an apparatus may comprise at least one inertial sensor coupled to at least one processor having instructions to measure a level of acceleration vibration of a mobile device based, at least in part, on at least one signal received from the at least one inertial sensor; detect a change in an angle of a measured gravity vector applied to the mobile device contemporaneously with the acceleration vibration; and determine whether the mobile device is at rest based, at least in part, on the measured level and the detected change.

In yet another implementation, an apparatus may comprise means for measuring a level of acceleration vibration of a mobile device based, at least in part, on at least one signal received from at least one inertial sensor; means for detecting a change in an angle of a measured gravity vector applied to the mobile device contemporaneously with the acceleration vibration; and means for determining whether the mobile device is at rest based, at least in part, on the measured level and the detected change.

In yet another implementation, an article may comprise a storage medium having instructions stored thereon executable by a special purpose computing platform to measure a level of acceleration vibration of a mobile device based, at least in part, on at least one signal received from at least one inertial sensor; detect a change in an angle of a measured gravity vector applied to the mobile device contemporaneously with the acceleration vibration; and determine whether the mobile device is at rest based, at least in part, on the measured level and the detected change.

In one particular implementation, an inertial sensor may comprise, for example, a three-dimensional (3D) accelerometer disposed on the mobile device. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for detecting a state of rest of a mobile communication device in an efficient or effective manner using, at least in part, accelerometer output signals. As will be described in greater detail below, output signals from an accelerometer may represent, for example, sensor measurements with respect to acceleration vibration as well as rotation about gravity of a mobile communication device. As used herein, "mobile device," "mobile communication device," "wireless device," "hand-held device," or the plural form of such terms may be used interchangeably and may refer to any kind of special purpose computing platform or device that may be capable of communicating through wireless transmission or receipt of information over suitable communications networks according to one or more communication protocols and that may from time to time have a position, location, or orientation that changes. As a way of illustration, special purpose mobile communication devices, which may herein be called simply mobile devices, may include, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. It should be appreciated, however, that these are merely illustrative examples of mobile devices that may be utilized in connection with rest detection using accelerometer output signals, and that claimed subject matter is not limited in this regard.

As previously mentioned, a mobile device may include one or more inertial or motion sensors to provide signals for use by a variety of applications including, for example, motion-controlled games interpreting user's hand or wrist gestures as inputs representing user selections, commands, or other user-device interactions. Inertial sensor signals may also be utilized by a location or navigation application interpreting user's gestures as instructions, for example, to determine an orientation of a mobile device relative to some reference within a physical environment, to estimate a location of a mobile device or navigation target, to suggest or confirm a navigation route, or the like. In addition, output signals from inertial sensors may be provided to facilitate or support various functionalities in connection, for example, with user-intended input gestures for selecting or scrolling through information on a mobile device. By way of example but not limitation, a user may employ informative gestures in connection with a mobile application to select, fast forward, or rewind music, to zoom, pan, or browse through digital maps or Web content, to select suitable or desired options from various menus displayed on a screen associated with a mobile device, or the like. Of course, details relating to particular applications or functionalities of a mobile device are merely examples, and claimed subject matter is not so limited.

At times, however, certain motions representative of input gestures of a user may require a period of rest, for example, to enable their proper detection. As used herein, a "motion" may refer to a physical displacement of an object, such as a mobile device, for example, relative to some frame of reference. As a way of illustration, a physical displacement may include, for example, changes in terms of an object's velocity, acceleration, position, orientation, or the like. Thus, as a pre-condition for interpreting a particular motion of a mobile device as a user-intended or informative gesture, in some instances, the mobile device may initially determine or detect that it is in a state of rest. To illustrate, an orientation of a mobile device, for example, may be determined, at least in part, by processing signals received from an inertial sensor, such as an accelerometer, as one possible example.

As will be described in greater detail below, these signals may be representative of various measurements taken at certain points in time. Since orientation may typically, although not necessarily, be determined from processing an output signal generated by a relatively stable inertial sensor, thus, prior to computing orientation, it may be desirable to ensure or declare that a mobile device is in some form of rest. This may facilitate or support, for example, informative gesture recognition in settings or environments that may be fraught with or otherwise have higher instances of false detections due to incidental signals, as will also be seen. Of course, such details relating to orientation determination of a mobile device are merely examples, and claimed subject matter is not limited in this regard.

Typically, although not necessarily, various motion states including a state of rest of a mobile device may be detected, at least in part, using signal measurements from one or more inertial sensors, such as, for example, an accelerometer, a gyroscope, a magnetometer, or the like, as indicated above. An accelerometer, for example, may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. As will be described in greater detail below, a direction of gravity may be measured in relation to any suitable frame of reference, such as, for example, in a coordinate system in which the origin or initial point of gravity vectors is fixed to or moves with a mobile device. An example coordinate system that may be used, in whole or in part, to facilitate or support one or more processes associated with rest detection of a mobile device will be described in greater detail below in connection with FIG. 1. A gyroscope may utilize the Coriolis effect and may provide angular rate measurements in roll, pitch, or yaw dimensions and may be used, for example, in applications determining heading or azimuth changes. A magnetometer may measure the direction of a magnetic field in X, Y, Z dimensions and may be used, for example, in sensing true North or absolute heading in various navigation applications. It should be noted that these are merely examples of sensors that may be used, in whole or in part, to determine various states of a mobile device, and that claimed subject matter is not limited in this regard.

Following the above discussion, a state of rest of a mobile device may be determined, at least in part, by these sensors or other sensors not listed performing their respective measurement activities and configured to or otherwise capable of detecting one or more sensor measurements larger than a certain threshold value(s). For example, an acceleration measurement due to various vibrations or a gyroscope measurement due to angular changes exceeding a predefined threshold value(s) may indicate that a mobile device is in motion. Also, a pattern of sensor measurements, such as, for example, a sequence of acceleration peaks observed during a certain time interval may be sufficient to infer a motion of a mobile device, just to illustrate another possible example. Otherwise, if a sensor measurement signal(s) does not change, for example, or otherwise change(s) little so as not to exceed a certain threshold value(s), it may be inferred that a mobile device is in a state of rest.

As was indicated, the utilization of multiple sensors to provide various measurement signals for use, for example, by a variety of motion-controlled or motion-supported applications may, however, present a number of challenges. Such challenges may include, for example, increased complexity, size, cost, power consumption, etc. of a mobile device. As a way of illustration, processing measurement signals from multiple on-board sensors may, for example, increase power consumption of mobile devices having limited power resources, such as battery-operated smart telephones, thus, affecting operating lifetime of such devices. By way of another example, employing multiple on-board sensors to detect motion may also increase cost or size of a mobile device. Utilization of external sensors may involve, for example, signal conditioning, measurements pre-processing or collection, communication of sensor information to an external processor, etc., which may also lead to increased complexity, cost, power management issues, or the like.

To address these or other challenges, techniques may include, for example, integrating a lesser number of sensors in a single mobile device or, optionally or alternatively, employing a lesser number of sensors for motion detection. For example, a mobile device may include a single inertial sensor, such as a three-dimensional (3D) accelerometer capable of providing multi-axes acceleration measurements with respect to the mobile device, though claimed subject matter is not so limited. Optionally or alternatively, a mobile device may employ an accelerometer that may comprise, for example, a two-dimensional (2D) accelerometer combined with a one-dimensional (1D) accelerometer. A mobile device may also comprise three 1D accelerometers for respective acceleration measurements in X, Y, Z dimensions, though, again, claimed subject matter is not so limited in scope. In addition, an accelerometer may sense or detect a rotational motion of a mobile device, such as, for example, its rotation about gravity with respect to roll or pitch dimensions, as described below. Accelerometers may be available from a variety of manufacturers, such as, for example, InvenSense, Inc., Analog Devices, Inc., Northrup Grumman, Inc., Kionix, Inc., etc. Despite a possible diversity in quality, grade, performance, etc., employing accelerometers that are reasonably consistent across multiple product lines is a desirable goal.

FIG. 1 illustrates an example coordinate system 100 that may be used, in whole or in part, to facilitate or support rest detection of a mobile device, such as a mobile device 102, for example, using accelerometer output signals according to an implementation. As illustrated, example coordinate system 100 may comprise, for example, three-dimensional Cartesian coordinate system, though claimed subject matter is not so limited. In this illustrated example, motion of mobile device 102 representing, for example, acceleration vibration may be detected or measured, at least in part, with reference to three dimensions or axes X, Y, and Z relative to the origin 104 of example coordinate system 100. It should be appreciated that example coordinate system 100 may or may not be aligned with a body of mobile device 102. It should also be noted that in certain implementations a non-Cartesian coordinate system may be used or that a coordinate system may define dimensions that are mutually orthogonal. As also illustrated, rotational motion of mobile device 102, such as orientation changes about gravity, for example, may be detected or measured, at least in part, with reference to one or two dimensions. For example, in one particular implementation, rotational motion of mobile device 102 may be detected or measured in terms of coordinates ($\phi$, $\tau$), where phi ($\phi$) represents roll or rotation about an X axis, as illustrated generally by arrow at 106, and tau ($\tau$) represents pitch or rotation about an Y axis, as illustrated generally at 108. Accordingly, in an implementation, a 3D accelerometer may detect or measure, at least in part, a level of acceleration vibration as well as a change about gravity with respect to roll or pitch dimensions, for example, thus, providing five dimensions of observability (X, Y, Z, $\phi$, $\tau$). It should be understood, however, that these are merely examples of various motions that may be detected or measured with reference to example coordinate system 100, and that claimed subject matter is not limited to these particular motions or coordinate system.

Following the above discussion, a 3D accelerometer may detect or measure accelerations in three-dimensional space due to various vibrations, for example, and may determine whether a mobile device has been moved. Typically, although not necessarily, acceleration vibrations may be associated, for example, with a moving vehicle (e.g., engine, wheels, etc. vibrations, unevenness in a road, etc.), user's walking or running, hand or wrist tremor, wind gusts, or other phenomena that may ordinarily exist in mobile settings or environments. As previously mentioned, if a level of measured acceleration vibration along, for example, any of three axes does not exceed some pre-defined threshold, a mobile device may infer that no motion has occurred and that the mobile device is in a state of rest.

Measuring or evaluating a level of acceleration vibration alone, however, may result in a higher rate of false detections including, for example, false positives due to incident signals indicating motion while a mobile device is in a state of rest. In addition, monitoring vibration alone to detect rest, for example, typically, although not necessarily, may involve application of a relatively low vibration threshold, which may often be exceeded in certain mobile settings or environments. For example, in some instances, such as while a user is in a moving vehicle or walking, a level of acceleration vibration of a mobile device held by the user in a relatively steady hand (e.g., while reading a message on a display, etc.) may be relatively high due to engine vibrations, walking, etc. so as to exceed some pre-defined threshold. Yet orientation of a mobile device or its rotation about gravity represented, for example, via roll or pitch angles may not change or may change little or relatively slowly. Thus, in some instances, such a mobile device may be considered stationary or substantially stationary relative to a current or local reference frame, such as, for example, the vehicle reference frame or the user's body, respectively. As such, it may be advantageous, for example, to declare that such a mobile device is in a state of rest so as to allow for an orientation computation using an output of a relatively stable accelerometer, notwithstanding some level of acceleration vibration representing background noise, as previously mentioned. Accordingly, it may be desirable to develop one or more methods, systems, or apparatuses that may implement an effective or efficient mobile device rest detection using, for example, accelerometer output signals regardless of whether a user operating the device is stationary, walking, running, being on board of a moving vehicle, or the like.

According to an implementation, in addition to a level of acceleration vibration, a measured change in an angle of a gravity vector or angular rate measurements in roll or pitch dimensions, for example, may also be used to determine whether a mobile device is in a state of rest. For example, as will be seen, an inertial sensor, such as a 3D accelerometer may be employed, at least in part, to monitor acceleration vibration along X, Y, Z axes as well as the rotation about gravity with respect to roll ($\phi$) or pitch ($\tau$) angles, thus, providing five dimensions of observability. Here, if a gravity vector remains relatively constant, for example, or changes little during a period of measured acceleration vibration, it may be inferred that a mobile device is in a reasonably stationary state, notwithstanding some level of vibration. To illustrate, a mobile device held steadily enough by a walking user so as to allow such a user to read or follow directions on a display, for example, may be declared to be at rest within its current reference frame (e.g., relative to the user's body, etc.), notwithstanding some level of acceleration vibration or noise due to the user's walking. In this illustrated example, since a user will not likely be rotating a mobile device with respect to gravity, an angular change in a gravity vector with respect to roll or pitch angles may remain relatively constant or change little, which may be utilized, for example, for more accurate gesture detection.

Here, for example, a threshold level of acceleration vibration may be advantageously increased so as to avoid or reduce false detections of various gestures, thus, enabling informative gesture recognition in mobile settings or environments, as previously mentioned. As such, if a gravity vector changes significantly or otherwise exceeds a certain threshold level during an observation period of measured acceleration vibration, for example, even if the measured vibration is relatively low or otherwise within a pre-defined threshold, it may be determined that a mobile device is not at rest. Likewise, if a threshold level of acceleration vibration is exceeded, even though roll or pitch angles remain relatively constant, for example, a mobile device may detect or infer motion. In other words, a mobile device may be declared stationary if, for example, acceleration vibration measurements and angular rate measurements both indicate that the mobile device is stationary, just to illustrate one possible implementation. Of course, details relating to detecting various motion states of a mobile device in mobile settings or environments are merely examples, and claimed subject matter is not so limited.

In one particular implementation, a threshold applied to a measured level of acceleration vibration for determining whether a mobile device is not at rest may be varied based, at least in part, on a measured change or rate of change of a gravity vector angle, as was indicated. More generally, a change in an angle of a measured gravity vector may, for example, be detected contemporaneously with acceleration vibration. More specifically, changes in a gravity vector angle may, for example, be correlated in time with measured acceleration vibration by sampling measurements of the gravity angle vector at points in an interval during which a measured acceleration vibration occurs. A threshold applied to the measured acceleration vibration may then be varied based, at least in part, on changes in the gravity angle vector as indicated by changes in the sampled measurements, for example. In certain implementations, one or more threshold values may be user-configurable and may be based, at least in part, on a particular mobile environment, application, or the like.

Figure 2:
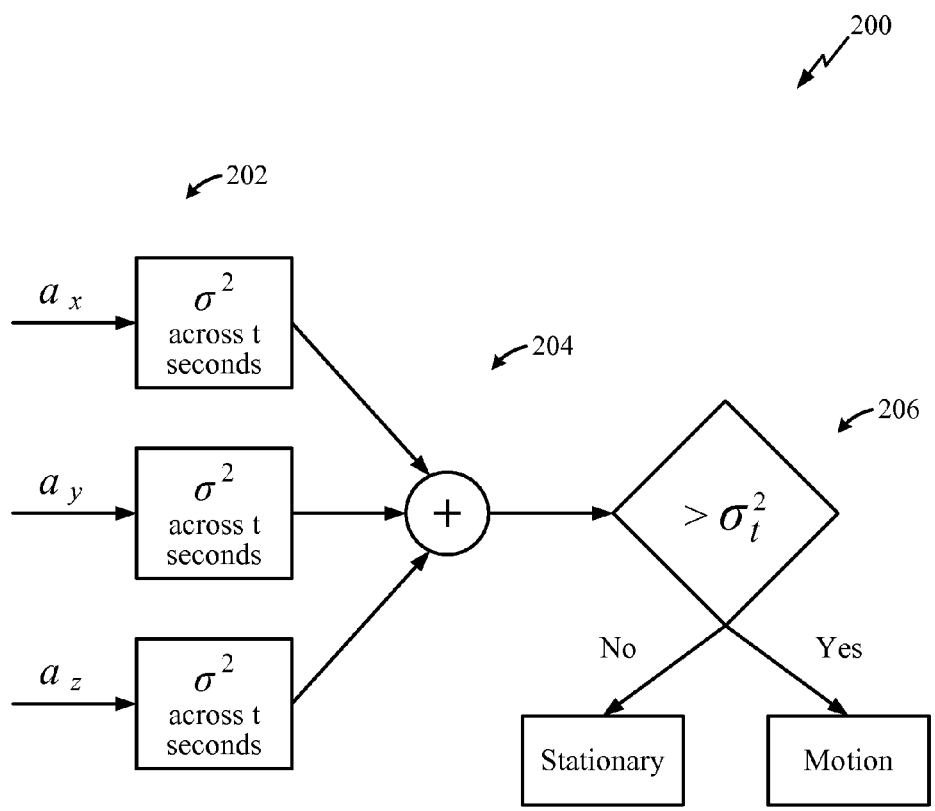
FIG. 2 is a flow diagram illustrating an example process for performing acceleration vibration detection according to an implementation.

FIG. 2 is a flow diagram illustrating an example process 200 for performing acceleration vibration detection of a mobile device according to an implementation. Here, for example, at operation 202, measurements of acceleration vibration $a_x$, $a_y$, $a_z$ of a mobile device may be sampled across three accelerometer axes X, Y, Z, respectively, and a variance $\sigma^2$ of each axis across some time window may be computed using known techniques. It should be noted that in one particular implementation, one or more incoming accelerometer samples may be filtered in some manner, such as using, for example, a low-pass filtering process, though claimed subject matter is not so limited. Optionally or alternatively, a variance of each axis may be computed across some time window where accelerometer samples are unfiltered. By way of example but not limitation, in certain experiments or simulations, accelerometer window time of 0.2 seconds and unfiltered samples were used. Of course, claimed subject matter is not so limited in scope.

With regard to operation 204, variances of each axis of an accelerometer across suitable or desired window time samples, such as the most recent n accelerometer samples, for example, may be summed together. Here, for example, the sum of the variances across all three accelerometer axes may be representative, at least in part, of a measured level of acceleration vibration experienced by a mobile device during an observation time period. At operation 206, the sum of the variances may be compared against some pre-defined acceleration vibration threshold $\sigma_t^2$. If the sum of the variances representing computed vibration exceeds some pre-defined acceleration vibration threshold $\sigma_t^2$, a mobile device may infer that it is not at rest and that motion has taken place across, for example, the most recent n accelerometer samples, just to illustrate one possible implementation. Otherwise, if the sum of variances is less than some pre-defined acceleration vibration threshold $\sigma_t^2$, a mobile device may be declared stationary or at rest, for example, with respect to a level of acceleration vibration.

An acceleration vibration threshold $\sigma_t^2$ may be determined, at least in part, experimentally and may be pre-defined or configured by a user, for example, or otherwise dynamically defined in some manner depending on a particular environment, application, or the like. By way of example but not limitation, in one particular simulation or experiment, it appeared that an acceleration vibration threshold in a range between 0.3 g and 0.5 g may prove beneficial for gesture recognition in relatively dynamic settings or environments (e.g., in-vehicle, walking, etc.), wherein g denotes an acceleration constant of 9.80665 meters per second squared (m/s$^2$). Of course, details relating to acceleration vibration detection or an acceleration vibration threshold are intended as merely examples to which claimed subject matter is not limited.

Figure 3A:
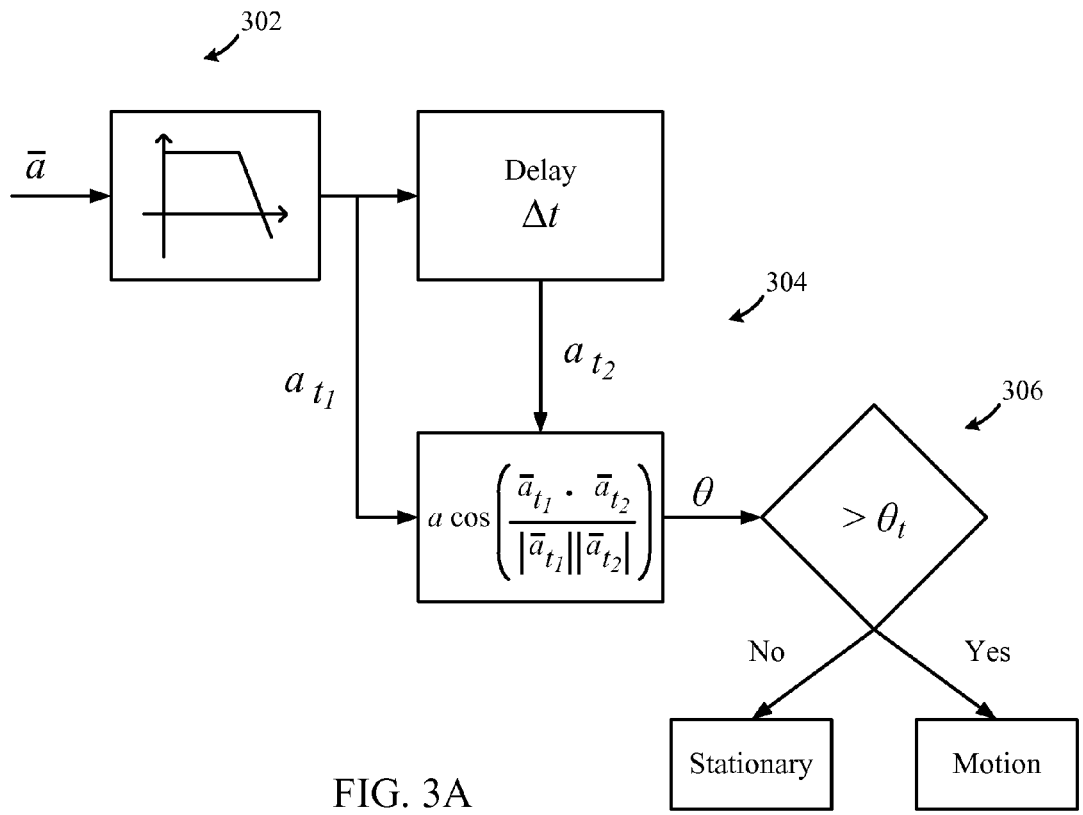
FIG. 3A is a flow diagram illustrating an example process for measuring an angular change in a gravity vector according to an implementation.

As previously mentioned, in addition to acceleration vibration, a measured change in an angle of a gravity vector or angular rate measurements, for example, in roll or pitch dimensions may also be used to determine whether a mobile device is in a state of rest. FIG. 3A is a flow diagram illustrating an example process 300 for detecting or measuring an angular change in a gravity vector based, at least in part, on signals received from an inertial sensor, such as an accelerometer, for example, according to an implementation. At operation 302, the direction of a gravity vector may be monitored or sampled in some manner. For example, in one particular implementation, the direction of a gravity vector may be sampled or measured contemporaneously with measuring a level or acceleration vibration, such as during an observation time period correlating with an accelerometer window time discussed in connection with operation 202 above. As used herein in the context of measurement signals processing, "contemporaneously" may refer to an operation or technique in which two or more measurements may originate, occur, or otherwise exist at substantially the same time. In other words, to detect a change in an angle of a measured gravity vector, accelerometer measurements with respect to the gravity vector may be sampled, for example, at points in an interval during which a measured acceleration vibration occurs, as previously mentioned. For this example, as shown, incoming accelerometer samples may be filtered in some manner, such as by using or applying, for example, a low-pass filtering process. In one particular simulation or experiment, a gravity vector was sufficiently isolated by removing high-frequency spectra via low-pass filtering a sample signal with a 1.5 Hz second order or bi-quadratic infinite impulse response (IIR) filter. Of course, this is merely an example implementation of a low-pass filter, and claimed subject matter is not so limited. Optionally or alternatively, one or more sample signals with respect to a gravity vector may be unfiltered.

With regard to operation 304, sample measurements of a gravity vector monitored, for example, by low-pass filtering an accelerometer output may be selected, and an angular change in a gravity vector may be computed. Here, selected sample measurements may comprise, for example, two sequential sample measurements $a^{t_1}$ and $a^{t_2}$ of a monitored gravity vector, meaning that these measurements may comprise a sequence of measurements taken at two different times, which may or may not be consecutive. For example, although claimed subject matter is not limited in this regard, a first and last accelerometer samples in a memory buffer associated with a mobile device may be selected or used as sample measurements for angle computation. Typically, although not necessarily, memory buffers may be utilized, at least in part, to collect measurement information for further transmission to a processing unit or some other component in a burst or otherwise concurrent fashion, for example. Memory buffers are known and need not be described here in greater detail. Continuing with the above example, sequential measurements $a^{t_1}$ and $a^{t_2}$ of a monitored gravity vector may be spaced apart or separated by some length of time or delay $\Delta t$, which may correlate with an interval of a measured acceleration vibration, as was indicated. Thus, in one particular implementation, delay $\Delta t$ of 0.2 seconds may be used, for example, for selecting sample measurements $a^{t_1}$ and $a^{t_2}$ so as to compute an angular change of a monitored gravity vector, though claimed subject matter is not so limited, of course.

Figure 3B:
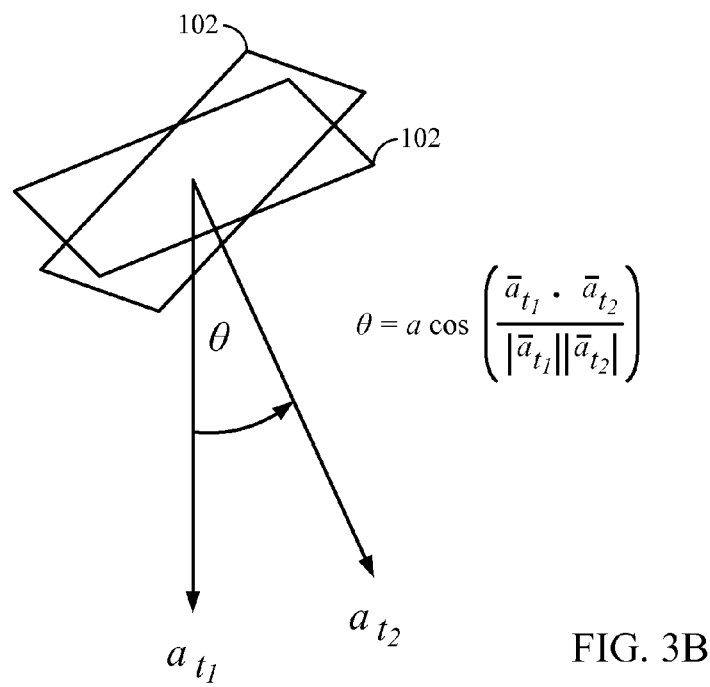
FIG. 3B illustrates an example computation of an angular change in a gravity vector according to an implementation.

FIG. 3B illustrates an example computation of an angular change representative of a rotation of a mobile device, such as mobile device 102, for example, about gravity with respect to roll or pitch dimensions according to an implementation. As seen, here, a measured change about gravity may be defined, for example, by an angle $\theta$ between two sample measurements, which may be schematically represented as two sequential gravity measurements shown as vectors $a^{t_1}$ and $a^{t_2}$, respectively. Gravity vectors $a^{t_1}$ and $a^{t_2}$ may be considered, for example, in relation to any suitable or desired coordinate system, such as a coordinate system ($\phi$, $\tau$) described above in connection with FIG. 1, for example, in which the origin or initial point of vectors is fixed to or moves with mobile device 102, though claimed subject matter is not so limited. Thus, an angular change representative of a rotation of mobile device 102 about gravity during an observation period or between $t_1$ and $t_2$ may, for example, be computed as:

$$\theta = a\cos\left(\frac{\vec{a}_{t_1} \cdot \vec{a}_{t_2}}{|\vec{a}_{t_1}||\vec{a}_{t_2}|}\right) \quad (1)$$

Referring back to FIG. 3A, as seen, at operation 306, a computed angle $\theta$ may be compared against some pre-defined rotation or angular change threshold $\theta_r$. If a computed angle $\theta$ exceeds such a rotation threshold $\theta_r$, mobile device 102 may infer that it is not at rest and that motion has taken place between, for example, $t_1$ and $t_2$ within a coordinate system ($\phi$, $\tau$), just to illustrate one possible implementation. Thus, here, a stationary state with respect to rotation of mobile device 102 may be inferred, for example, if a computed angle $\theta$ between two sequential gravity vectors $a^{t_1}$ and $a^{t_2}$ is less than a pre-defined rotation threshold. By way of example but not limitation, in certain simulations or experiments, a threshold of $$\frac{11.5}{180.0}\pi$$

or 0.2 radians may prove beneficial in handling rotation detection in connection, for example, with a threshold applied to a measured level of acceleration vibration for determining whether mobile device 102 is at rest. Of course, this is merely an example of a threshold that may be used for rotation detection, and claimed subject matter is not so limited.

Figure 4:
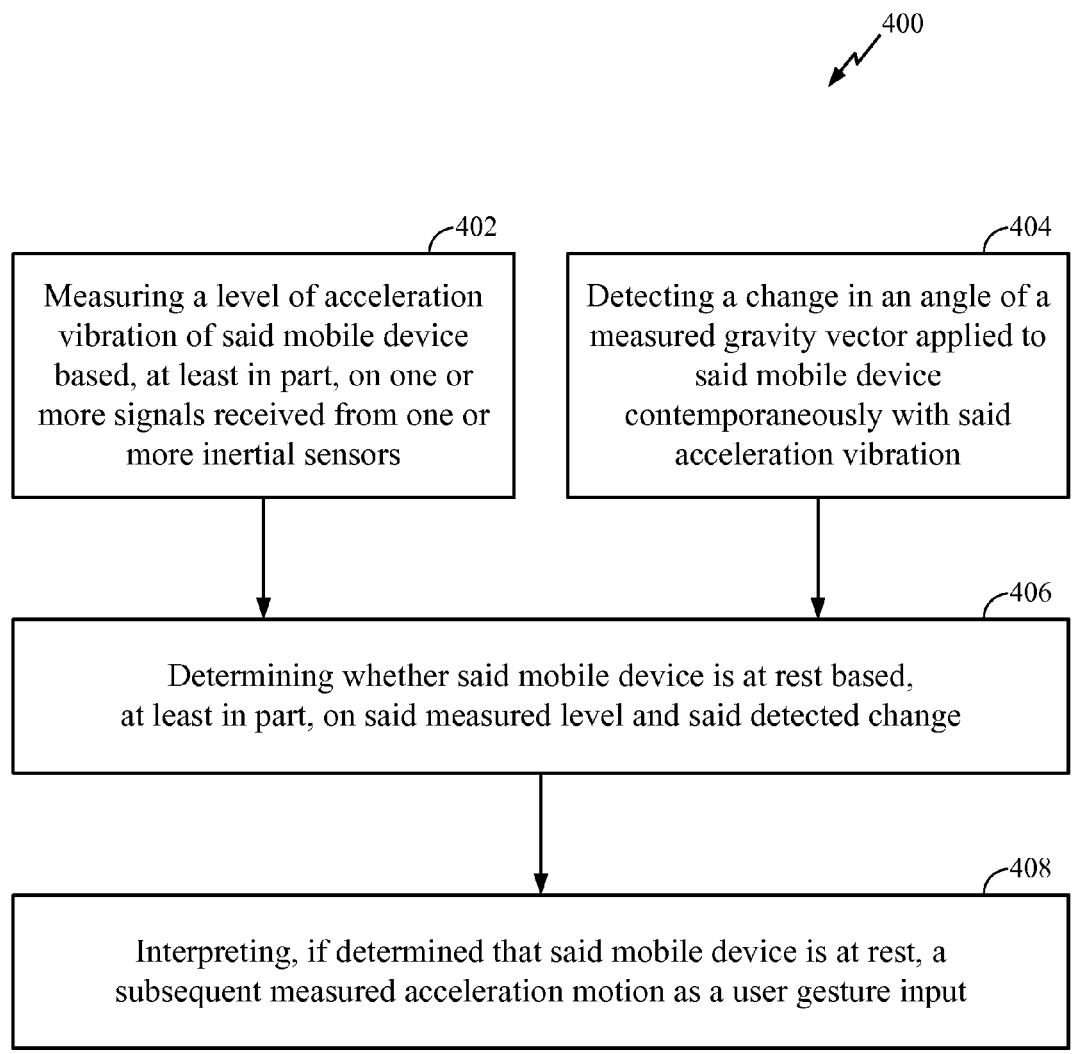
FIG. 4 is a flow diagram illustrating an example process for determining whether a mobile device is at rest according to an implementation.

FIG. 4 is a flow diagram illustrating an implementation of an example process 400 that may be implemented, in whole or in part, to detect a state of rest of a mobile device using, for example, accelerometer measurement signals. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 400 may begin at operation 402, for example, with measuring a level of acceleration vibration of a mobile device based, at least in part, on one or more signals received from one or more inertial sensors. These one or more signals may be received, for example, from a 3D accelerometer that may be disposed on a mobile device, though claimed subject matter is not so limited. As was indicated, measurements with respect to a level of acceleration vibration may be sampled across one or more accelerometer axes, and a variance of each sampled axis may be computed. For example, a variance of each axis may be computed, at least in part, across some time window where accelerometer samples are unfiltered.

At operation 404, a change in an angle of a measured gravity vector applied to a mobile device contemporaneously with an acceleration vibration may be detected. For example, accelerometer measurements with respect to a gravity vector may be sampled in roll or pitch dimensions at points in an interval during which a measured acceleration vibration occurs, as previously mentioned. In an implementation, incoming accelerometer samples may be filtered based, at least in part, on an application of a low-pass filtering model so as to reduce or remove, for example, high-frequency spectra, and a change in an angle of a measured gravity vector may be computed. Here, for example, sample measurements may comprise two sequential measurements of a monitored gravity vector, though claimed subject matter is not limited, of course.

With regard to operation 406, a mobile device may determine whether it is in a state of rest based, at least in part, on a measured level of acceleration vibration and a detected change in an angle of a measured gravity vector. Here, for example, a measured level of acceleration vibration may be compared against some pre-defined acceleration vibration threshold. Likewise, a computed angular change with respect to a measured gravity vector may also be compared against some pre-defined rotation threshold. As previously mentioned, an acceleration vibration threshold or rotation threshold may be user-configurable and may depend, at least in part, on a mobile environment, application, or the like. In this illustrated example, if a measured level of acceleration vibration and a detected angular change of a measured gravity vector both indicate that a mobile device is stationary, it may be determined or declared that a mobile device is at rest, as previously mentioned.

At operation 408, if a mobile device is determined or declared to be at rest, for example, a subsequent measured acceleration motion may be interpreted as a user gesture input. For example, having detected rest, a mobile device may interpret a measured acceleration motion as a user-intended or informative hand or wrist gesture representative of a user selection, command, etc. in various motion-controlled games, navigation applications, or the like, as previously mentioned. Thus, in some instances, rest detection may facilitate or support, for example, informative or user-intended gesture recognition in settings or environments that may have higher instances of false motion or rest detections, as was also indicated. It should be noted that operation 308 may be optional in certain implementations.

Figure 5:
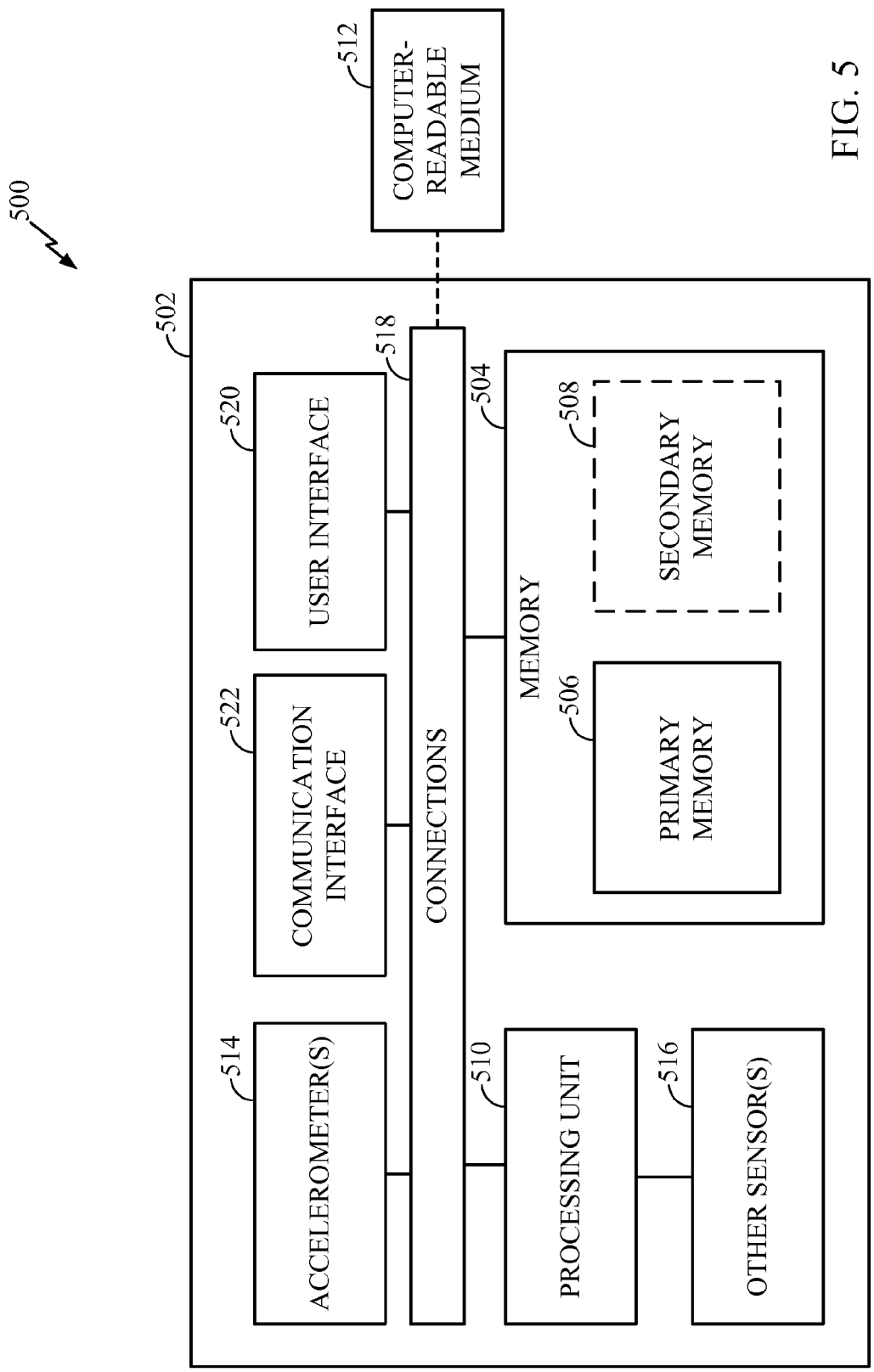
FIG. 5 is a schematic diagram illustrating an example computing environment associated with a mobile device according to an implementation.

FIG. 5 is a schematic diagram illustrating an implementation of an example computing environment 500 that may include one or more networks or devices capable of partially or substantially implementing or supporting one or more processes for detecting a state of rest of a mobile device using, at least in part, accelerometer output signals. It should be appreciated that all or part of various devices or networks shown in computing environment 500, processes, or methods, as described herein, may be implemented using various hardware, firmware, or any combination thereof along with software.

Computing environment 500 may include, for example, a mobile device 502, which may be communicatively coupled to any, number of other devices, mobile or otherwise, via a suitable communications network, such as a cellular telephone network, the Internet, mobile ad-hoc network, wireless sensor network, or the like. In an implementation, mobile device 502 may be representative of any electronic device, appliance, or machine that may be capable of exchanging information over any suitable communications network. For example, mobile device 502 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 502 may take the form of one or more integrated circuits, circuit boards, or the like that may be operatively enabled for use in another device. Although not shown, optionally or alternatively, there may be additional devices, mobile or otherwise, communicatively coupled to mobile device 502 to facilitate or otherwise support one or more processes associated with computing environment 500. Thus, unless stated otherwise, to simplify discussion, various functionalities, elements, components, etc. are described below with reference to mobile device 502 may also be applicable to other devices not shown so as to support one or more processes associated with example computing environment 500.

Computing environment 500 may include, for example, various computing or communication resources capable of providing position or location information with regard to a mobile device 502 based, at least in part, on one or more wireless signals associated with a positioning system, location-based service, or the like. Although not shown, in certain example implementations, mobile device 502 may include, for example, a location-aware or tracking unit capable of acquiring or providing all or part of orientation, position information (e.g., via trilateration, heat map signature matching, etc.), etc. Such information may be provided in support of one or more processes in response to user instructions, motion-controlled or otherwise, which may be stored in memory 504, for example, along with other suitable or desired information, such as one or more threshold values, or the like.

Memory 504 may represent any suitable or desired information storage medium. For example, memory 504 may include a primary memory 506 and a secondary memory 508. Primary memory 506 may include, for example, a random access memory, read only memory, etc. While illustrated in this example as being separate from a processing unit 510, it should be appreciated that all or part of primary memory 506 may be provided within or otherwise co-located/coupled with processing unit 510. Secondary memory 508 may include, for example, the same or similar type of memory as primary memory or one or more information storage devices or systems, such as, for example, a disk drive, an optical disc drive, a tape drive, a solid state memory drive, etc. In certain implementations, secondary memory 508 may be operatively receptive of, or otherwise enabled to be coupled to, a computer-readable medium 512.

Computer-readable medium 512 may include, for example, any medium that can store or provide access to information, code or instructions (e.g., an article of manufacture, etc.) for one or more devices associated with operating environment 500. For example, computer-readable medium 512 may be provided or accessed by processing unit 510. As such, in certain example implementations, the methods or apparatuses may take the form, in whole or part, of a computer-readable medium that may include computer-implementable instructions stored thereon, which, if executed by at least one processing unit or other like circuitry, may enable processing unit 510 or the other like circuitry to perform all or portions of a location determination processes, sensor-based or sensor-supported measurements (e.g., acceleration, deceleration, orientation, tilt, rotation, etc.) or any like processes to facilitate or otherwise support rest detection of mobile device 502. In certain example implementations, processing unit 510 may be capable of performing or supporting other functions, such as communications, gaming, or the like.

Processing unit 510 may be implemented in hardware or a combination of hardware and software. Processing unit 510 may be representative of one or more circuits capable of performing at least a portion of information computing technique or process. By way of example but not limitation, processing unit 510 may include one or more processors, controllers, microprocessors, microcontrollers, application specific integrated circuits, digital signal processors, programmable logic devices, field programmable gate arrays, or the like, or any combination thereof.

Mobile device 502 may include various components or circuitry, such as, for example, one or more accelerometers 514, or various other sensor(s) 516, such as a magnetic compass, a gyroscope, a video sensor, a gravitometer, etc. to facilitate or otherwise support one or more processes associated with operating environment 500. For example, such sensors may provide analog or digital signals to processing unit 510. Although not shown, it should be noted that mobile device 502 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 502 may also include a memory or information buffer to collect suitable or desired information, such as, for example, accelerometer measurement information, as previously mentioned. Mobile device may also include a power source, for example, to provide power to some or all of the components or circuitry of mobile device 502. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 502.

Mobile device 502 may include one or more connections 518 (e.g., buses, lines, conductors, optic fibers, etc.) to operatively couple various circuits together, and a user interface 520 (e.g., display, touch screen, keypad, buttons, knobs, microphone, speaker, trackball, data port, etc.) to receive user input, facilitate or support sensor-related signal measurements, or provide information to a user. Mobile device 502 may further include a communication interface 522 (e.g., wireless transmitter or receiver, modem, antenna, etc.) to allow for communication with one or more other devices or systems over one or more suitable communications networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising, at a mobile device:
   measuring a level of acceleration vibration of said mobile device during a time period based on at least one acceleration vibration signal received from an accelerometer;
   detecting a change in an angle of a measured gravity vector applied to said mobile device during the time period based on at least one pitch or roll signal received from the accelerometer;
   varying an acceleration vibration threshold based, at least in part, on said detected change in said angle of said measured gravity vector;
   determining that said measured level of acceleration vibration does not exceed said acceleration vibration threshold;
   determining that said mobile device is at rest based, at least in part, on determining that said measured level of acceleration vibration does not exceed said acceleration vibration threshold;
   interpreting, by said mobile device and based on the determining that said mobile device is at rest, a measured acceleration motion as a user gesture input; and
   controlling, by said mobile device, an application of said mobile device based on said user gesture input.

2. The method of claim 1, wherein said detecting said change in said angle of said measured gravity vector further comprises:
   obtaining measurements of said angle at multiple instances; and
   comparing said measurements to determine said change.

3. The method of claim 2, and further comprising:
   correlating in time said measurements of said angle with said acceleration vibration.

4. The method of claim 2, wherein said measurements of said angle are obtained based, at least in part, on an application of a low-pass filtering model.

5. The method of claim 1, wherein said detecting said change in said angle of said measured gravity vector further comprises:
   processing signals representing two sequential measurements of said measured gravity vector; and
   computing said angle based, at least in part, on said two processed sequential measurements.

6. The method of claim 1, wherein said varying said acceleration vibration threshold further comprises increasing said acceleration vibration threshold to detect motion of said mobile device using, at least in part, said detected change in said angle of said measured gravity vector.

7. The method of claim 6, wherein said detecting said motion of said mobile device using said detected change in said angle further comprises comparing said detected change in said angle to a rotation threshold.

8. The method of claim 7, wherein said rotation threshold is user-configurable.

9. The method of claim 1, wherein said acceleration vibration threshold is user-configurable.

10. The method of claim 1, wherein the level of acceleration vibration comprises a sum of variances of acceleration vibration signals received from the accelerometer.

11. The method of claim 1, wherein the method further comprises:
   detecting an environment of the mobile device based, at least in part, upon the detecting a change in an angle of a measured gravity vector applied to said mobile device; and
   wherein the varying of an acceleration vibration threshold is based, at least in part, on said environment of the mobile device.

12. An apparatus comprising:
   a single three-dimensional accelerometer coupled to at least one processor having instructions to:
      measure a level of acceleration vibration of a mobile device during a time period based on at least one acceleration vibration signal received from said accelerometer;
      detect a change in an angle of a measured gravity vector applied to said mobile device during the time period based on at least one of a pitch and roll signal received from the accelerometer;
      vary an acceleration vibration threshold based, at least in part, on said detected change in said angle of said measured gravity vector;
      determine that said measured level of acceleration vibration does not exceed said acceleration vibration threshold;
      determine that said mobile device is at rest based, at least in part, on whether said measured level of acceleration vibration does not exceed said acceleration vibration threshold;
      interpret a measured acceleration motion as a user gesture input; and
      control an application of said mobile device based on said user gesture input.

13. The apparatus of claim 12, wherein said instructions to detect said change in said angle of said measured gravity vector further comprise instructions to:
   obtain measurements of said angle at multiple instances; and
   compare said measurements to determine said change.

14. The apparatus of claim 13, wherein said instructions to detect said change in said angle of said measured gravity vector further comprise instructions to:
   correlate in time said measurements of said angle with said acceleration vibration.

15. The apparatus of claim 13, wherein said measurements of said angle are obtained based, at least in part, on an application of a low-pass filtering model.

16. The apparatus of claim 12, wherein said instructions to detect said change in said angle of said measured gravity vector further comprise instructions to:
   process signals representing two sequential measurements of said measured gravity vector; and
   compute said angle based, at least in part, on said two processed sequential measurements.

17. The apparatus of claim 12, wherein said instructions to vary said acceleration vibration threshold further comprise instructions to:
   increase said acceleration vibration threshold to detect motion of said mobile device using, at least in part, said detected change in said angle of said measured gravity vector.

18. The apparatus of claim 17, wherein said to detect said motion of said mobile device using said detected change in said angle further comprises instructions to compare said detected change in said angle to a rotation threshold.

19. The apparatus of claim 12, wherein the level of acceleration vibration comprises a sum of variances of acceleration vibration signals received from the accelerometer.

20. The apparatus of claim 12, wherein the instruction further detect an environment of the mobile device based, at least in part, upon the detecting a change in an angle of a measured gravity vector applied to said mobile device; and
   wherein the varying of an acceleration vibration threshold is based, at least in part, on said environment of the mobile device.

21. An apparatus comprising:
   means for measuring a level of acceleration vibration of a mobile device during a time period based on at least one acceleration vibration signal received from an accelerometer of said mobile device;
   means for detecting a change in an angle of a measured gravity vector applied to said mobile device during the time period based on a pitch signal or roll signal received from the accelerometer of said mobile device;
   means for varying an acceleration vibration threshold based, at least in part, on said detected change in said angle of said measured gravity vector;
   means for determining whether said measured level of acceleration vibration does not exceed said acceleration vibration threshold;
   means for determining whether said mobile device is at rest based, at least in part, on determining whether said measured level of acceleration vibration does not exceed said acceleration vibration threshold;
   means for interpreting, based on the determining whether said mobile device is at rest, a measured acceleration motion as a user gesture input; and
   means for controlling an application of said mobile device based on said user gesture input.

22. The apparatus of claim 21, wherein said means for detecting said change in said angle of said measured gravity vector further comprises:
   means for obtaining measurements of said angle at multiple instances; and
   means for comparing said measurements to determine said change.

23. The apparatus of claim 22, and further comprising:
means for correlating in time said measurements of said angle with said acceleration vibration.

24. The apparatus of claim 22, wherein said measurements of said angle are obtained based, at least in part, on an application of a low-pass filtering model.

25. The apparatus of claim 21, wherein said means for detecting said change in said angle of said measured gravity vector further comprises:
means for processing signals representing two sequential measurements of said measured gravity vector; and
means for computing said angle based, at least in part, on said two processed sequential measurements.

26. The apparatus of claim 21, wherein said means for varying said acceleration vibration threshold further comprises means for increasing said acceleration vibration threshold to detect motion of said mobile device using, at least in part, said detected change in said angle of said measured gravity vector.

27. The apparatus of claim 26, wherein said means for increasing said acceleration vibration threshold to detect said motion further comprises means for comparing said detected change in said angle to a rotation threshold.

28. The apparatus of claim 21, wherein the level of acceleration vibration comprises a sum of variances of acceleration vibration signals received from the accelerometer.

29. The apparatus of claim 21, further comprising a means for detecting an environment of the mobile device based, at least in part, upon the means for detecting a change in an angle of a measured gravity vector applied to said mobile device; and
wherein the means for varying of an acceleration vibration threshold is based, at least in part, on said environment of the mobile device.

30. An article comprising:
a non-transitory computer-readable medium having instructions stored thereon executable by a special purpose computing platform to execute a method, comprising:
instructions for measuring a level of acceleration vibration of a mobile device during a time period based on multiple acceleration vibration signals received from a particular accelerometer;
instructions for detecting a change in an angle of a measured gravity vector applied to said mobile device during the time period based on a pitch signal and a roll signal received from the accelerometer;
instructions for varying an acceleration vibration threshold based, at least in part, on said detected change in said angle of said measured gravity vector;
instructions for determining whether said measured level of acceleration vibration does not exceed said acceleration vibration threshold;
instructions for determining whether said mobile device is at rest based, at least in part, on whether said measured level of acceleration vibration does not exceed said acceleration vibration threshold;
instructions for interpreting, based on determining that said mobile device is at rest, a measured acceleration motion as a user gesture input; and
instructions for controlling an application of said mobile device based on said user gesture input.

31. The article of claim 30, wherein said instructions to detect said change in said angle of said measured gravity vector further comprise:
instructions for obtaining measurements of said angle at multiple instances; and
instructions for comparing said measurements to determine said change.

32. The article of claim 31, wherein said non-transitory computer-readable medium further comprises instructions to:
instructions for correlating in time said measurements of said angle with said acceleration vibration.

33. The article of claim 31, wherein said measurements of said angle are obtained based, at least in part, on an application of a low-pass filtering model.

34. The article of claim 30, wherein said instructions to detect said change in said angle of said measured gravity vector further comprise instructions to:
instructions for processing signals representing two sequential measurements of said measured gravity vector; and
instructions for computing said angle based, at least in part, on said two processed sequential measurements.

35. The article of claim 30, wherein said instructions to vary said acceleration vibration threshold further comprise instructions to:
instructions for increasing said acceleration vibration threshold to detect motion of said mobile device using, at least in part, said detected change in said angle of said measured gravity vector.

36. The article of claim 30, wherein the level of acceleration vibration comprises a sum of variances of acceleration vibration signals received from the accelerometer.

37. The article of claim 30, wherein the instructions stored thereon executable by a special purpose computing platform to execute a method, further comprise instructions for detecting an environment of the mobile device based, at least in part, upon said detecting a change in an angle of a measured gravity vector applied to said mobile device; and
wherein the instructions for varying of an acceleration vibration threshold is based, at least in part, on said environment of the mobile device.

* * * * *